F. PERSIC.
AUTOMOBILE TIRE PROTECTOR.
APPLICATION FILED DEC. 18, 1912.
1,081,694.
Patented Dec. 16, 1913.
2 SHEETS—SHEET 2.
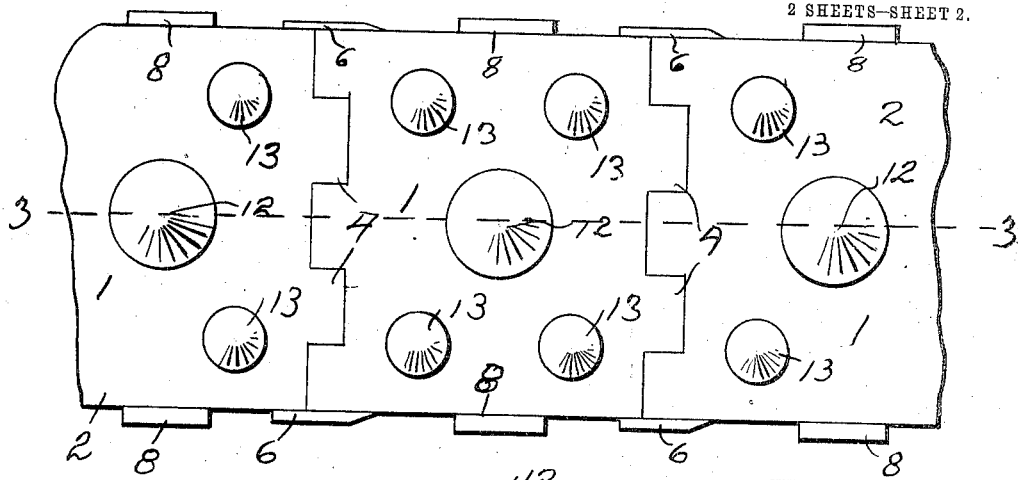
Fig. 2.
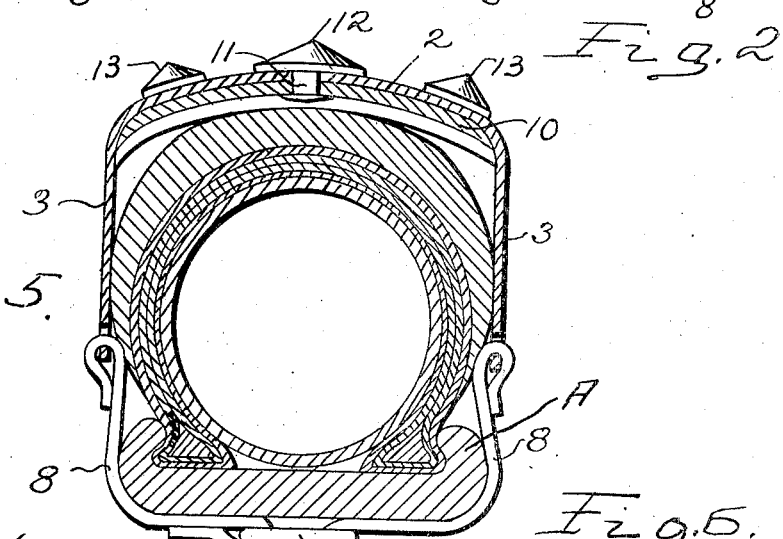
Fig. 5.
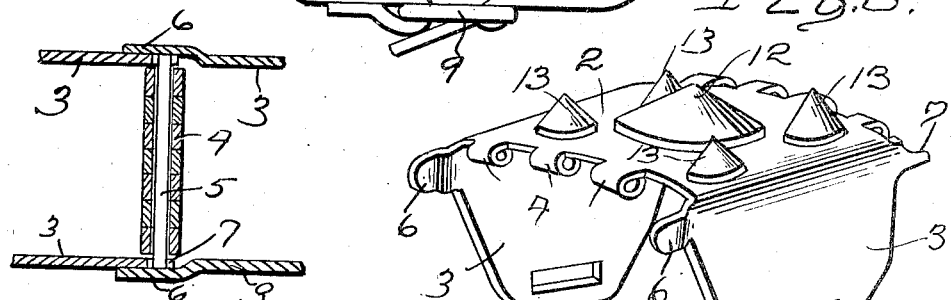
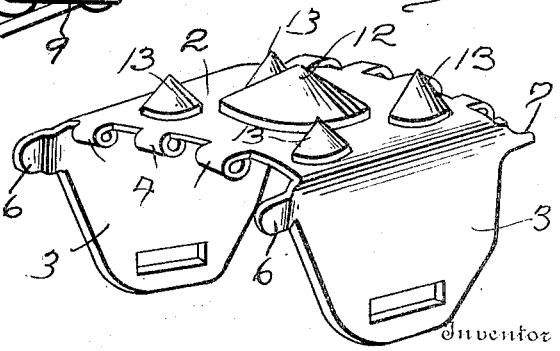
Fig. 4. Fig. 6.
Witnesses
Inventor
Frank Persic
Attorney

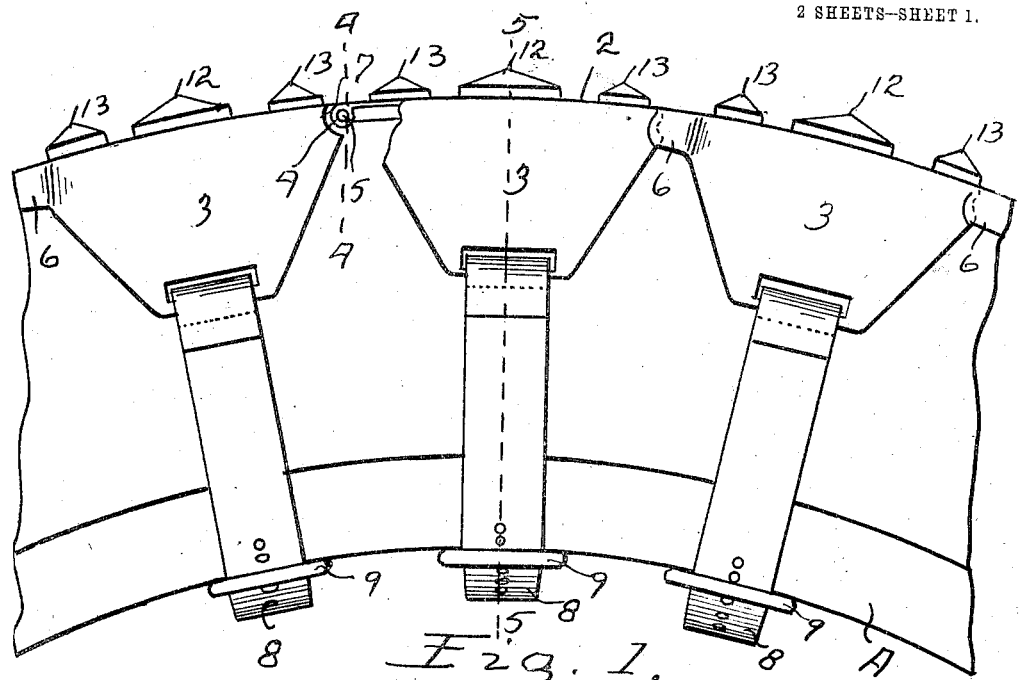
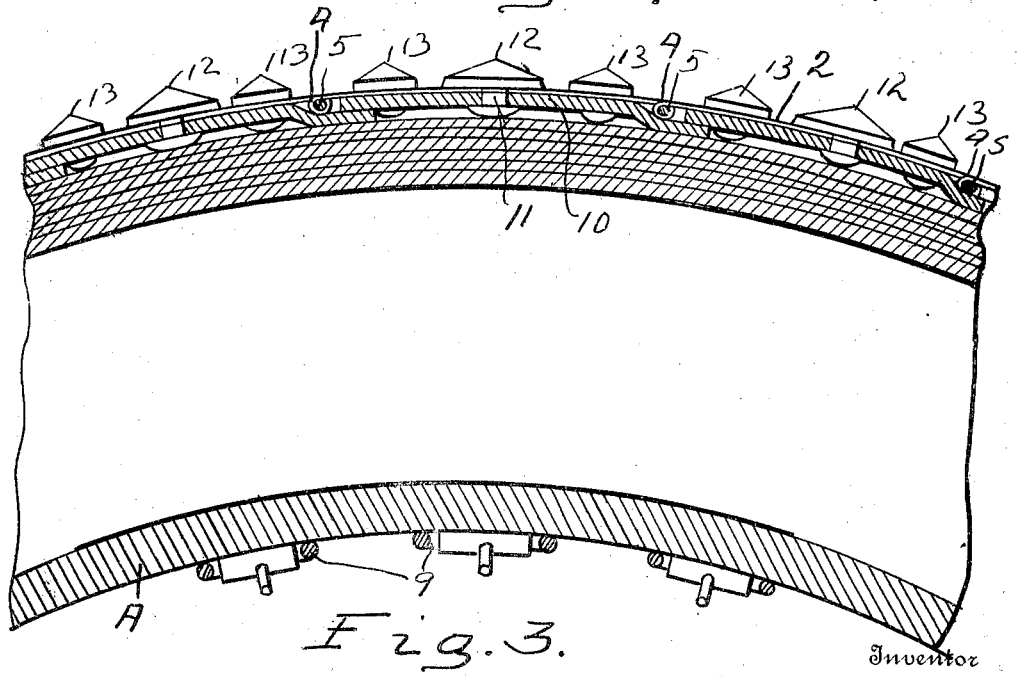

UNITED STATES PATENT OFFICE.

FRANK PERSIC, OF MINONK, ILLINOIS.

AUTOMOBILE TIRE-PROTECTOR.

1,081,694.  Specification of Letters Patent.  Patented Dec. 16, 1913.

Application filed December 18, 1912. Serial No. 737,529.

*To all whom it may concern:*

Be it known that I, FRANK PERSIC, a citizen of the United States, residing at Minonk, in the county of Woodford and State of Illinois, have invented certain new and useful Improvements in Automobile Tire-Protectors, of which the following is a specification.

This invention relates to automobile tire protectors and particularly to a protector for use upon pneumatic tires; and it has for its primary object the provision of a plurality of flexibly connected protecting plates or shields which are adapted to wholly embrace the tread and adjacent portions respectively of the shoe or outer casing of the tire whereby to protect the same from foreign particles, such as tacks or like pointed objects.

A further object of the invention is to provide elastic means within said protecting plates; arranging said means whereby the joints between the adjacent plates will be held wholly out of contact with the adjacent surfaces of the shoe of the tire to thereby prevent the chafing of the tire through contact with the plates; and, further, the provision of fastening devices for securing the elastic plates to the tire and the arrangement of portions of the device upon the exterior tread surfaces of the plates, so as to form resistant surfaces to permit the tire to obtain such effective purchase with the surface of the ground as will prevent skidding of the vehicle.

A still further object of the invention is to provide a sectional metallic protector wherein any one or particular section of the series may be removed without necessitating the removal of the adjacent sections.

Another object of the invention is the provision of means for hingedly connecting the adjacent sections and for guarding the hinge pins against casual displacement.

With these and other objects in view, the invention consists of certain novel features of construction, combination and arrangement of parts, as will be hereinafter described and claimed.

In the accompanying drawings: Figure 1 is a side view of a portion of a vehicle wheel, showing the application of the protector to the tire thereof; Fig. 2 is a plan view thereof; Fig. 3 is a section on the line 3—3 of Fig. 2; Fig. 4 is a section on line 4—4 of Fig. 1; Fig. 5 is a section on line 5—5 of Fig. 1; and Fig. 6 is a perspective view of one of the protector sections.

The protector comprises identical sections 1, which are constructed preferably of metallic plates, each being bent so as to provide a tread portion 2 and side flanges 3. The tread portion 2 of each section is provided along each of its transverse edges with hinge knuckles 4, and as shown the knuckles of one plate are associated with knuckles of adjacent plates and connected therewith by hinge pins 5, whereby the companion plates are free for relative movements to permit the protector to properly respond to the yielding movements of the tire. The side flanges 3 are each of a reduced width toward its inner end whereby the edges of the flanges of adjacent sections are disposed in inwardly diverging relation relatively to permit of the required hinge movements of the plates, as will be apparent.

At one end each of the sections 1 has its flanges 3 provided with bendable guard extensions 6, while at the opposite end and in line with the hinge knuckles the flanges are recessed, as at 7, whereby to expose the extremities of the hinge pins when it is desired, to remove a particular section of the protector from the wheel. The extensions 6 of one section overlap the flanges 3 of an adjacent section, as clearly illustrated in Fig. 1, whereby the extremities of the hinge pin are concealed to prevent the casual displacement of the pin when the protector is in use. The extensions 6 are slightly offset from the main length of the flanges 3 and they are adapted to be bent in an outward direction whereby to expose the hinge pins of a particular section when the latter is to be removed from the tire. This construction is such that any one of the sections can be readily removed without necessitating an entire removal of the adjacent section.

The side flanges 3 of each section are provided with straps or equivalent connecting elements 8, one of the straps having a buckle 9 to operatively receive the free terminal of the other strap, as shown in Fig. 5. In this manner the protector will be securely confined against the rim A of the wheel, herein conventionally shown, and the protector sections properly supported around the tread surface of the tire. Each of said sections is provided with an inner elastic surface 10, which preferably comprises a strip of leather, rubber, canvas or the like, being secured at some point in its length to the portion 2 through the medium of a rivet 11 having a relatively broad and somewhat pointed head 12 exteriorly of the portion 2, so as to form the maximum resisting surface to prevent skidding of the wheel. The strip 10 has one of its ends extended beyond an adjacent end of its section, so as to underlie the hinge joint and to also underlie one terminal of the strip 10 of the adjacent protector section. In order to increase the anti-skidding efficiency of the protector, it is also desirable to provide each section with a plurality of relatively pointed surfaces 13, the surface engaging extremities of each being disposed in the same general line with the extremities of the rivets 11.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention, as claimed.

Having thus described my invention, what I claim is:—

1. A tire protector comprising sections, each of said sections having hinge knuckles on its opposite edges, each of said sections being rectangular in cross section, the knuckles of one section being alined with the knuckles of an adjacent section, hinge pins passing through the alined knuckles of adjacent sections, and bendable portions formed integral with the sides of each section at the upper edge thereof and disposed outwardly of and engaging the ends of the adjacent hinge pin to form guards to prevent the pin from longitudinal separation from its knuckles, and said bendable portions overlying the adjacent section.

2. A tire protector comprising sections, each of said sections being rectangular in cross section, each of said sections having hinge knuckles on its opposite edges, the knuckles of one section being alined with the knuckles of an adjacent section, hinge pins passing through the alined knuckles of adjacent sections, bendable portions formed integral with each section adjacent the upper edge of the sides of each section and off-set and disposed outwardly of and engaging the ends of the adjacent hinge pin to form guards to prevent the pin from longitudinal separation from its knuckles, said offset bendable portions engaging an adjacent section, and a rim clamping member carried by each of said sections.

3. A tire protector comprising embracing sections having alined hinge knuckles, one of the sections having recesses therein in line with the knuckles, a pin extending through the knuckles and removably fitted therein, and bendable portions carried by the other section and overlying the recesses and the ends of the hinge pin.

4. A tire protector, a plurality of protecting sections relatively arranged to embrace the tread of the tire, hinges connecting the sections with each other, an elastic strip carried by each section and located between the section and the tread of the tire and having a portion underlying the joints between adjacent sections, and a fastening device securing the strip to the section.

In testimony whereof I affix my signature in presence of two witnesses.

FRANK PERSIC.

Witnesses:
 A. J. KENSZ,
 F. ADAME.